United States Patent
Li et al.

(10) Patent No.: US 11,108,577 B2
(45) Date of Patent: *Aug. 31, 2021

(54) METHOD AND APPARATUS FOR ESTABLISHING CHAT GROUP

(71) Applicant: Tencent Technology (Shenzhen) Company Limited, Shenzhen (CN)

(72) Inventors: Wei Li, Shenzhen (CN); Remyylyang Ho, Shenzhen (CN); Yi Shan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

This patent is subject to a terminal disclaimer.

(21) Appl. No.: 15/702,562

(22) Filed: Sep. 12, 2017

(65) Prior Publication Data
US 2018/0006835 A1    Jan. 4, 2018

Related U.S. Application Data

(63) Continuation of application No. 13/994,081, filed on Jun. 13, 2013, now Pat. No. 9,794,080, which is a (Continued)

(51) Int. Cl.
*H04L 12/18* (2006.01)
*H04L 12/58* (2006.01)
(Continued)

(52) U.S. Cl.
CPC ...... *H04L 12/1818* (2013.01); *H04L 12/1822* (2013.01); *H04L 51/20* (2013.01)

(58) Field of Classification Search
CPC ... H04L 51/32; H04L 12/1818; H04L 67/306; H04L 67/02; H04L 51/04; H04L 51/043;
(Continued)

(56) References Cited

U.S. PATENT DOCUMENTS 6,788,949 B1  9/2004 Bansal
7,124,164 B1  10/2006 Chemtob
(Continued)

FOREIGN PATENT DOCUMENTS

CN  1471273 A  1/2004
CN  1794834 A  6/2006
(Continued)

OTHER PUBLICATIONS

Tencent Technology, ISRWO, PCT/CN2013/074988, dated Feb. 20, 2014, 7 pgs.
(Continued)

*Primary Examiner* — David R Lazaro
*Assistant Examiner* — Berhanu Shitayewoldetadik
(74) *Attorney, Agent, or Firm* — Morgan, Lewis & Bockius LLP

(57) ABSTRACT

A method including: receiving, from a first terminal, a request for establishing a chat group without receiving an identifier of an existing social network contact; monitoring incoming requests for additional users to join the first chat group; while monitoring, detecting a request from a second terminal to obtain information of other terminals located around the second terminal; in accordance with the request from the second terminal and in accordance with a determination that the second terminal and the first terminal are located within a preset distance, requesting authentication information corresponding to the first chat group; receiving the authentication information from the second terminal, wherein the authentication information is obtained by the second user independently of the server of the social network platform; and in accordance with a determination that the authentication information is correct, establishing the first chat group including the first user and the second user.

20 Claims, 9 Drawing Sheets

Related U.S. Application Data continuation of application No. PCT/CN2013/074988, filed on Apr. 28, 2013.

(51) Int. Cl.
*H04L 29/00* (2006.01)
*H04L 15/16* (2006.01)
*G06F 15/16* (2006.01)

(58) Field of Classification Search
CPC ... H04L 12/1822; H04L 51/046; H04L 51/20; H04N 21/8358; G06Q 10/10
See application file for complete search history.

(56) References Cited

U.S. PATENT DOCUMENTS

| | | | |
|---|---|---|---|
| 7,266,383 B2 | 9/2007 | Anderson | |
| 7,478,129 B1 | 1/2009 | Chemtob | |
| 7,844,664 B2 | 11/2010 | Li et al. | |
| 7,882,194 B2* | 2/2011 | Lingafelt | H04L 12/1822 709/207 |
| 8,370,428 B1* | 2/2013 | Bayliss | H04L 51/046 455/411 |
| 8,572,696 B1* | 10/2013 | Wiacek | H04W 4/185 726/4 |
| 9,154,514 B1* | 10/2015 | Prakash | H04L 51/12 |
| 10,334,207 B2* | 6/2019 | Clavel | H04L 65/604 |
| 2004/0267884 A1* | 12/2004 | Sar-Shalom | H04M 1/72547 709/206 |
| 2005/0021624 A1* | 1/2005 | Herf | H04L 12/1822 709/204 |
| 2005/0113123 A1 | 5/2005 | Torvinen | |
| 2005/0186970 A1 | 8/2005 | Yates et al. | |
| 2005/0273496 A1 | 12/2005 | Jean et al. | |
| 2006/0020678 A1* | 1/2006 | Kessler | H04L 67/325 709/207 |
| 2007/0026958 A1 | 2/2007 | Barasch et al. | |
| 2007/0042792 A1* | 2/2007 | Perfetto | H04M 3/42263 455/461 |
| 2007/0086064 A1* | 4/2007 | Koyama | G06Q 10/107 358/402 |
| 2007/0198647 A1* | 8/2007 | Lingafelt | H04L 12/1822 709/207 |
| 2008/0008106 A1 | 1/2008 | Boberg et al. | |
| 2008/0195706 A1 | 8/2008 | Li et al. | |
| 2009/0106455 A1* | 4/2009 | Xu | H04L 67/1095 709/248 |
| 2009/0254843 A1* | 10/2009 | Van Wie | G06F 3/04815 715/757 |
| 2010/0056183 A1 | 3/2010 | Oh | |
| 2010/0081116 A1 | 4/2010 | Barasch et al. | |
| 2011/0035594 A1* | 2/2011 | Fox | G06Q 30/02 713/170 |
| 2011/0113101 A1 | 5/2011 | Ye et al. | |
| 2012/0079022 A1 | 3/2012 | Kim et al. | |
| 2012/0110099 A1* | 5/2012 | Fujihara | H04L 12/1818 709/206 |
| 2012/0254774 A1* | 10/2012 | Patton | H04L 51/20 715/758 |
| 2012/0275444 A1 | 11/2012 | Shahsavari | |
| 2012/0323687 A1* | 12/2012 | Schuster | H04L 67/306 705/14.57 |
| 2013/0004929 A1* | 1/2013 | Otwell | G09B 5/00 434/350 |
| 2013/0136089 A1* | 5/2013 | Gillett | H04L 67/16 370/329 |
| 2013/0165171 A1 | 6/2013 | Pai et al. | |
| 2014/0067702 A1* | 3/2014 | Rathod | G06Q 10/10 705/319 |
| 2014/0074629 A1* | 3/2014 | Rathod | G06Q 30/0277 705/14.73 |
| 2014/0127659 A1 | 5/2014 | Barasch et al. | |
| 2014/0289343 A1* | 9/2014 | Turakhia | H04L 12/1822 709/206 |
| 2014/0324993 A1* | 10/2014 | Li | H04L 12/1818 709/206 |
| 2015/0326513 A1* | 11/2015 | Chiu | H04L 51/22 726/7 |
| 2016/0014151 A1* | 1/2016 | Prakash | H04L 63/1483 726/22 |
| 2018/0006835 A1* | 1/2018 | Li | H04L 12/1818 |

FOREIGN PATENT DOCUMENTS

| | | | | |
|---|---|---|---|---|
| CN | 1937790 | | 3/2007 | |
| CN | 101072148 | | 11/2007 | |
| CN | 101330386 | A * | 12/2008 | |
| CN | 101800931 | A | 8/2010 | |
| CN | 102006552 | A | 4/2011 | |
| CN | 103051517 | | 4/2013 | |
| EP | 1241890 | A2 | 9/2002 | |
| EP | 1691556 | A2 | 8/2006 | |
| JP | 2010250820 | A | 11/2010 | |
| JP | 2013050960 | A | 3/2013 | |
| JP | 2014101521 | A * | 6/2014 | |
| KR | 20030086527 | A * | 11/2003 | |
| KR | 20100136329 | A * | 12/2010 | |
| TW | 200736933 | | 10/2007 | |
| TW | 201238320 | A | 9/2012 | |
| WO | WO-2014147637 | A1 * | 9/2014 | H04L 51/04 |

OTHER PUBLICATIONS

Tencent Technology, IPRP, PCT/CN2013/074988, dated Nov. 3, 2015, 5 pgs.

\* cited by examiner

METHOD AND APPARATUS FOR ESTABLISHING CHAT GROUP

PRIORITY CLAIM AND RELATED APPLICATIONS

This application is a continuation application of U.S. patent application Ser. No. 13/994,081, filed Jun. 13, 2013, entitled "METHOD AND APPARATUS FOR ESTABLISHING CHAT GROUP", which is a continuation of PCT Application No. PCT/CN2013/074988, filed Apr. 28, 2013, entitled "METHOD AND APPARATUS FOR ESTABLISHING CHAT GROUP", both of which are hereby incorporated by reference in their entirety.

FIELD OF THE INVENTION

The present invention relates to mobile communication technologies, more particularly, to a method and apparatus for establishing a chat group.

BACKGROUND OF THE INVENTION

Along with the developments of mobile communication technologies, functions of mobile terminals become more and more powerful. By means of Instant Messaging (IM) tools in the mobile terminals, users may receive and send texts, pictures, and chat with other network users etc. As an Instant Messaging (IM) tools, WeChat have been accepted by more and more mobile communication users. Users of the WeChat may establish a chat group to communicate with friends in real time.

When establishing a chat group by using the WeChat, the user has to firstly select group members from contacts of the user, and then the user may initiate the chat group including the user and the selected group members. If the user needs to invite WeChat users which are not the contacts of the user, the user has to firstly add the WeChat users as contacts one by one, selects each group member from all contacts, and initiate the chat group finally.

As can be seen, the conventional operations performed when establishing the chat group is complicated. Especially, when the users of WeChat clients in the chat group to be established are together, e.g. when the user met his friends, it is more inconvenient for the user to establish a chat group for the friends around him.

In summary, the conventional solutions at least have the following defects: the operations for establishing the chat group is complicated, the procedure for establishing the chat group inconvenient for the user, and experiences of the user is not good especially when the user wants to invite friends around him to the group chat.

SUMMARY OF THE INVENTION

In view of the above, the embodiments of the present invention provide a method and apparatus for establishing a chat group, so as to simplify the operations performed when establishing the chat group and improve the experiences of the user.

Technical solutions are implemented as following:

A method for establishing a chat group comprises:
obtaining, by a server, an identifier of a user of a first client terminal, an identifier of a chat group to be established and a geographic position of the first terminal after receiving a request for establishing a chat group from a first client terminal;

establishing, by the server, a chat group entry and storing the entry on the server according to the identifier of the user of the first client terminal, the identifier of a chat group to be established and a geographic position of the first terminal;

selecting, by the server, at least one second client terminal within a predetermined geographic scope;

sending automatically an invitation message to join the chat group to the at least one second client terminal;

receiving, by the server and from the second client terminal, authentication information and performing authentication;

if the authentication is successful, allowing access of the second user to the chat group, and sending information of the second user to the first client terminal;

finishing, by the server, establishing the chat group when a preset finish condition is met.

An apparatus for establishing a chat group comprises: an interface and a processor, wherein the processor comprises an obtaining module, an establishing module, a selecting module, an adding module and a finishing module; and the interface is to receive a request for establishing a chat group sent by a first client terminal, the request for establishing the chat group comprises an identifier of the user of the first client terminal, an identifier of a chat group to be established; the interface is to sending automatically an invitation message to join the chat group to the at least one second client terminal after a chat group entry is established by the establishing module of the processor; to receive authentication information from the second client terminal; and to send information of the second client terminal to the first client terminal after the second client terminal is added into the chat group;

the obtaining module is to obtain the identifier of the user of the first client terminal, the identifier of a chat group to be established and a geographic position of the first terminal, according to the request for establishing the chat group;

the establishing module is to establish the chat group entry according to the identifier of the user of the first client terminal, the identifier of a chat group to be established and the geographic position of the first terminal;

the selecting module is to select at least one second client terminals within a predetermined geographic scope;

the adding module is to perform authentication; if the authentication is successful, allow access of the second user to the chat group;

the finishing module is to finish establishing the chat group when a preset condition is met.

A non-transitory computer readable medium storing instructions thereon for establishing a chat group, the instructions when executed by a processor cause the processor to perform the above-mentioned methods.

It can be seen from the above solutions, according to the embodiments of the present invention, the first client terminal does not need to add the friend as the contact firstly and then select the friend from all contacts. Instead, the first client terminal sends the request for establishing the chat group, more than one second client terminals in the predetermined geographic scope around the location of the first client may join the chat group, no matter whether the second client is one of contacts of the first client. The operations performed by the first client terminal that initiates the group chat are simplified, it is much convenient for the first client terminal to establish the chat group, and experiences of the user are improved.

BRIEF DESCRIPTION OF THE DRAWINGS

Specific examples of the present invention will be illustrated in detail hereinafter with reference to the accompanying drawings, so that the above and other characteristics and merits of the present invention are clearer for those skilled in the art.

DETAILED DESCRIPTION OF THE INVENTION

The embodiments of the present invention provide a method and apparatus for establishing a chat group, so as to simplify the operations performed when establishing the chat group and improve the experiences of the user.

In order to make the object, technical solution and merits of the present invention clearer, the present invention will be illustrated in detail hereinafter with reference to the accompanying drawings and specific examples.

In the embodiments of the present invention, the client terminal that initiates the chat group is called as the first client terminal, and the client terminal that is invited to the chat group is called as the second client terminal. One client terminal may be regarded as the first client terminal for one chat group or may be regarded as the second client terminal for another chat group.

Figure 1:
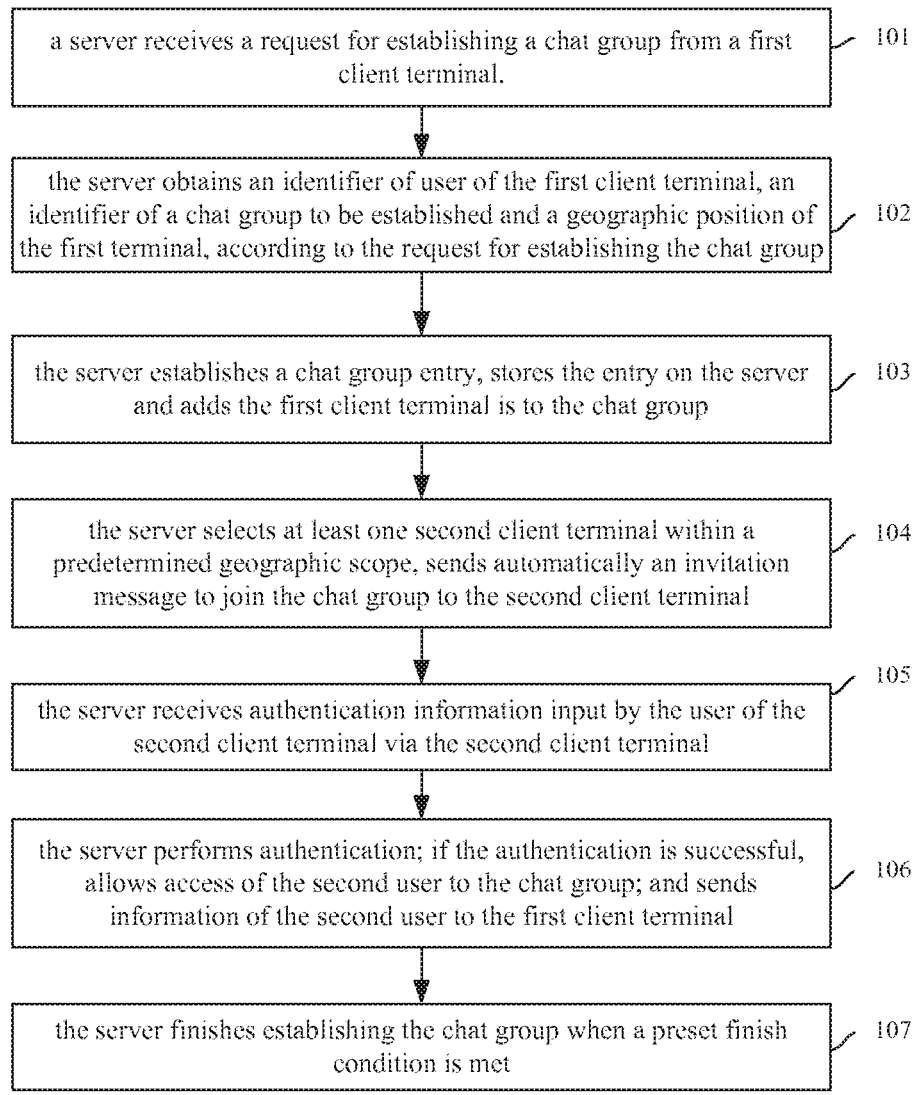
FIG. 1 is a schematic flowchart illustrating a method for establishing a chat group according to an embodiment of the present invention.

FIG. 1 is a schematic flowchart illustrating a method for establishing a chat group according to an embodiment of the present invention. As shown in FIG. 1, the method includes the following blocks.

In block 101, a server receives a request for establishing a chat group from a first client terminal. The request for establishing the chat group at least includes an identifier of the user of the first client terminal, an identifier of a chat group to be established.

In embodiments of the present invention, the first client terminal may obtain the identifier of the user when the user logs on the first client terminal. The user of the first client terminal may input the identifier of the chat group via the first client terminal, and then the first client terminal sends the identifier of the user and the identifier of the chat group to the server.

In an embodiment, the first client terminal may obtain a geographic position of the first client terminal before block 101 is performed, and the request for establishing a chat group may also include the geographic position of the first client terminal.

If the first client terminal does not obtain a geographic position of the first client terminal before block 101 is performed, the request for establishing a chat group only includes the identifier of the user of the first client terminal and the identifier of a chat group to be established.

In block 102, the server obtains the identifier of the user of the first client terminal, the identifier of a chat group to be established and the geographic position of the first terminal, according to the request for establishing the chat group.

In this block, when the request for establishing a chat group includes the identifier of the user of the first client terminal, the identifier of a chat group to be established and the geographic position of the first terminal, the server directly obtains the identifier of the user of the first client terminal, the identifier of a chat group to be established and a geographic position of the first terminal from the request for establishing a chat group.

When the request for establishing a chat group merely includes the identifier of the user of the first client terminal and the identifier of a chat group to be established, the server directly obtains the identifier of the user of the first client terminal and the identifier of a chat group to be established from the request for establishing a chat group, and obtains the geographic position of the first terminal by locating the first client terminal.

For example, the server may obtain geographic information of the first client terminal, e.g. Global Positioning System (GPS) information of the first client terminal, information of a cell of the first client terminal, or IP information of the first client terminal, and determine the geographic position of the first terminal according to the obtained geographic information.

In block 103, the server establishes a chat group entry according to the identifier of the user of the first client terminal, the identifier of a chat group to be established and a geographic position of the first terminal, stores the entry on the server and adds the first client terminal is to the chat group.

In block 104, the server selects at least one second client terminal within a predetermined geographic scope, and sends automatically an invitation message to join the chat group to the second client terminal.

In an embodiment, the server searches for client terminals around the first client terminal, and selects the client terminal as the second client terminal when the distance between the client terminal and the first client terminal is shorter than a preset value.

In another embodiment, the server searches for client terminals around the first client terminal and determines whether the client terminals around the first client terminal request to obtain information of client terminals located around, and selects the client terminal as the second client terminal when the distance between the client terminal and the first client terminal is shorter than the preset value and the client terminal requests to obtain information of other client terminals located around.

As can be seen, in embodiments of the present invention, the second client terminal receiving the invitation message to join the chat group are selected according to the geographic locations and the second client terminal may be not one of the contacts of the first client terminal, so that the first client terminal does not need to add the second client terminal as the contact firstly and then select the friend from all contacts, the operations performed by the first client terminal that initiates the group chat are simplified, it is much convenient for the first client terminal to establish the chat group, and experiences of the user are improved.

The invitation message to join the chat group may include the identifier of the first client terminal and an instruction of inputting the identifier of the chat group via the second client terminal, so as to provide the second client terminal with the identifier of the user of first client terminal and instruct the second client terminal to obtain authentication information when the second client terminal request to join the chat group.

Correspondingly, the second client terminal may display for the user that there is a chat group established by the first client terminal. When the user wants to join the chat group, the second client terminal requests the user to input the identifier of the chat group.

In another embodiment, the invitation message to join the chat group may include the identifier of the chat group and an instruction of inputting the identifier of the first client terminal via the second client terminal, so as to provide the second client terminal with the identifier of the chat group and instruct the second client terminal to obtain authentication information when the second client terminal request to join the chat group.

Correspondingly, the second client terminal may display the identifier of the chat group. When the user wants to join the chat group, the second client terminal requests the user to input the identifier of the first client terminal.

In block 105, the server receives authentication information input by the user of the second client terminal via the second client terminal.

In embodiments of the present invention, the second client terminal receives the authentication information input by the user and sends the authentication information to the server.

In block 106, the server performs authentication; if the authentication is successful, allows access of the second user to the chat group; and sends information of the second user to the first client terminal.

When the second client terminal is requested to input the identifier of the chat group in block 104, the server determines whether the authentication information is identical with the identifier of the chat group, and when the authentication information is identical with the identifier of the chat group, the authentication is successful.

When the second client terminal is requested to input the identifier of the first client terminal in block 104, the server determines whether the authentication information is identical with the identifier of the first client terminal, and when the authentication information is identical with the identifier of the first client terminal, the authentication is successful.

In block 107, the server finishes establishing the chat group when a preset finish condition is met.

In embodiments of the present invention, the preset finish condition includes a finish request sent from the first client terminal is received; or a procedure of establishing the chat group reaches a preset length of time; or the number of the group members reaches a preset maximum.

Thus, the chat group is established finally, and users joining the chat group may communicate with each other in this chat group.

In an example of the present invention, after being established, the chat group established based on geographic information may automatically become a normal chat group, e.g. the first client terminal may select one of the contacts to join the chat group.

Figure 2:
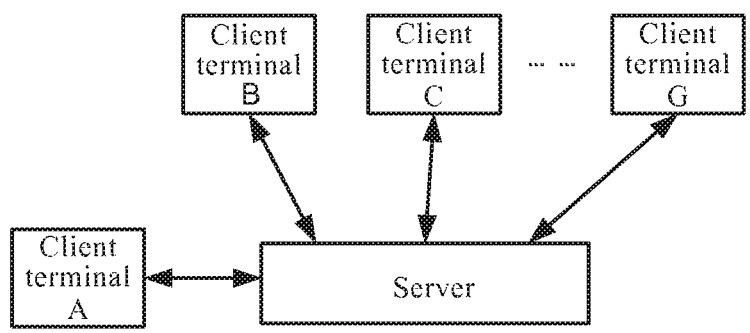
FIG. 2 is a schematic diagram illustrating a structure of a system for establishing a chat group according to an embodiment of the present invention.

FIG. 2 is a schematic diagram illustrating a structure of a system for establishing a chat group according to an embodiment of the present invention. In the embodiment, user A, user B, user C . . . and user G get together and they need to form a chat group of the WeChat application via client terminal A, client terminal B, client terminal C . . . and client terminal G respectively. The procedure of establishing the chat group will be described herein with reference to FIG. 3.

Figure 3:
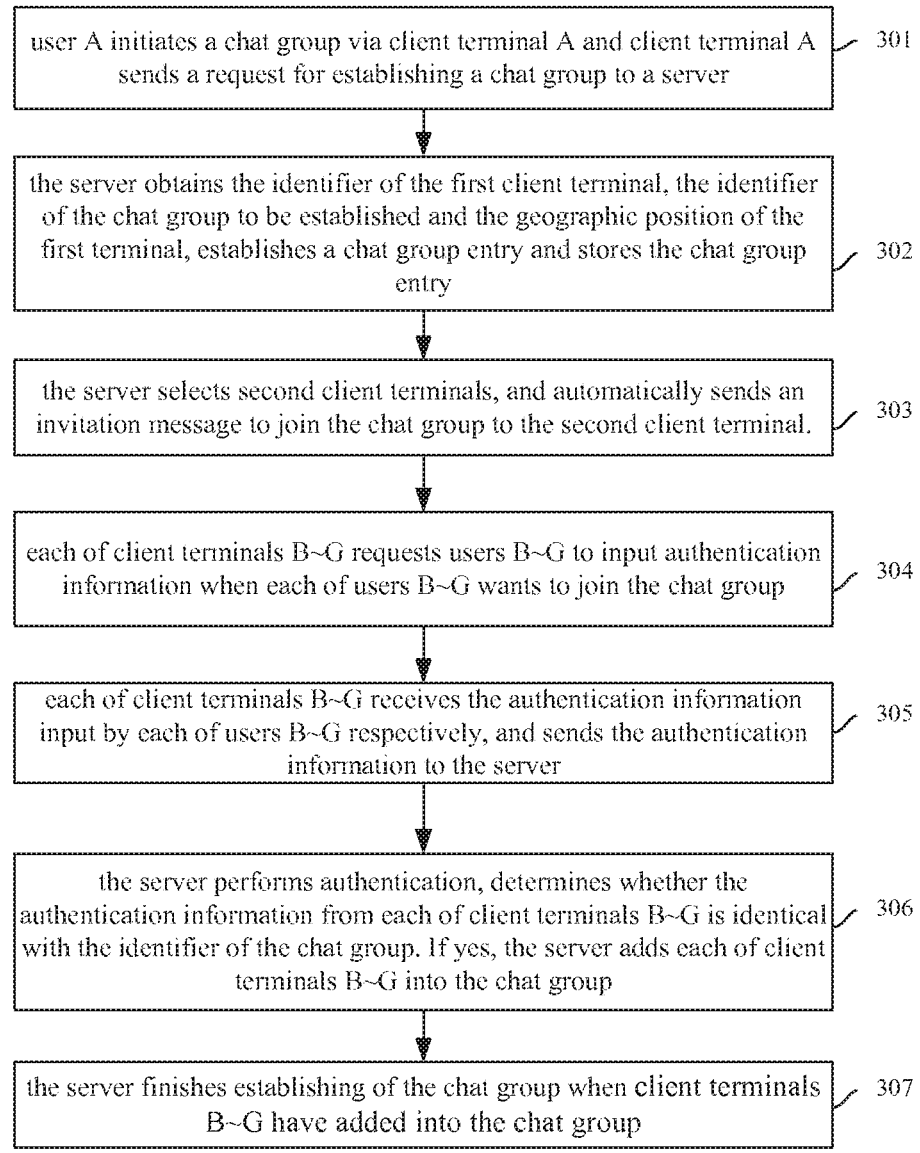
FIG. 3 is a schematic flowchart illustrating a method for establishing a chat group according to another embodiment of the present invention.

FIG. 3 is a schematic flowchart illustrating a method for establishing a chat group according to another embodiment of the present invention. As shown in FIG. 3, the method includes the following blocks.

In block 301, user A initiates a chat group via client terminal A and client terminal A sends a request for establishing a chat group to a server.

In this embodiment, user A may firstly request to obtain information of client terminals located around via client terminal A, and a geographic position of client terminal A is also obtained from the server. In practical applications, the geographic position of client terminal A may be obtained by using other modes which is not limited in the present invention.

Figure 4:
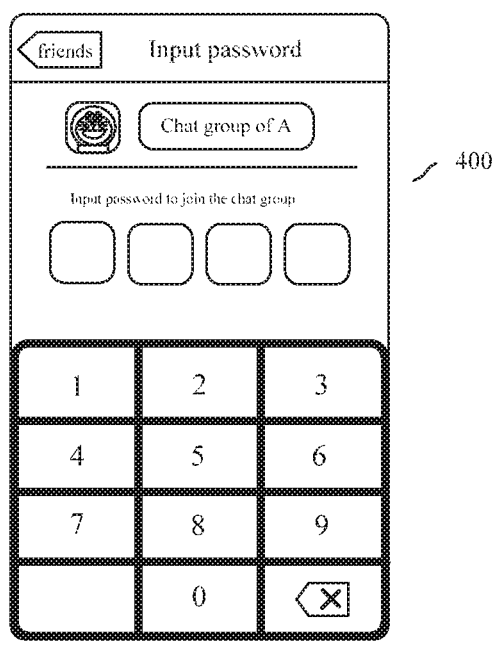
FIG. 4 is a schematic diagram illustrating an interface on a first client terminal when a chat group is initiated according to an embodiment of the present invention.

When user A initiates the chat group in this block, the user is requested to input an identifier of the chat group via an interface 400 of client terminal A. As shown in FIG. 4, the user is requested to input 4 digits as the identifier of the chat group, which may be regarded as the password of the chat group. In this block, the user A input "1013" via client terminal A.

In this way, the request for establishing a chat group sent by client terminal A includes the identifier of the first client terminal, the identifier of the chat group to be established and the geographic position of the first terminal.

In block 302, according to the request for establishing the chat group, the server obtains the identifier of the first client terminal, the identifier of the chat group to be established and the geographic position of the first terminal, establishes a chat group entry and stores the chat group entry.

In this embodiment, the server directly obtains the identifier of the first client terminal, the identifier of the chat group to be established and the geographic position of the first terminal from the request for establishing a chat group.

Figure 5:
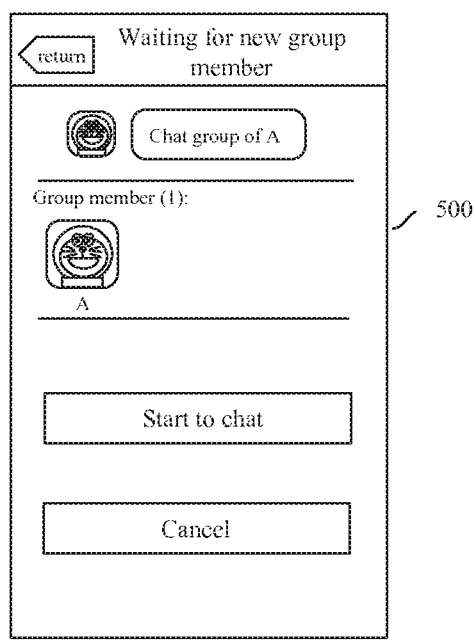
FIG. 5 is a schematic diagram illustrating an interface on a first client terminal when the first client terminal is added to a chat group according to an embodiment of the present invention.

When the server establishes the chat group entry, client terminal A is added to the chat group, and information of current chat group may be sent to client terminal A. As shown in FIG. 5, an interface 500 of client terminal A displays information of the current chat group for user A, which indicates that a chat group is began to be established and user A is current group member.

In block 303, the server selects second client terminals, and automatically sends an invitation message to join the chat group to the second client terminal. The invitation message includes the identifier of user A and an instruction of inputting the identifier of the chat group via the second client terminal.

In this embodiment, the server selects the client terminal as the second client terminal when the distance between the client terminal and the first client terminal is shorter than the 15 m and the client terminal requests to obtain information of client terminals located around, so that it is more purposeful when the server invites users to join the chat group and the work load of the server is reduced.

Because users from user A to user G get together, the geography positions of the client terminals are also not far away from each other. That is, the distance between client terminal A and each of client terminal B~G is short than 15 m.

Further, when each of client terminal B~G requests to obtain information of client terminals located around, the client terminal is selected as the second client terminal, and the identifier of user A is sent to the client terminal.

Figure 6:
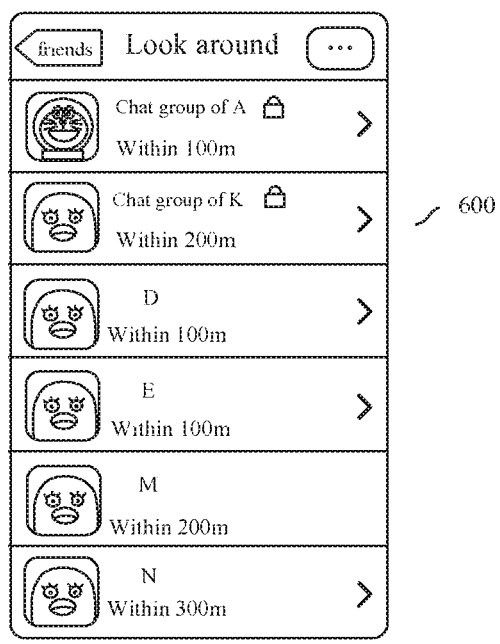
FIG. 6 is a schematic diagram illustrating an interface on a second client terminal when a second client terminal requests to obtain information of client terminals located around according to an embodiment of the present invention.

For example, after user B of client terminal B requests to obtain information of client terminals located around, the server provides the information of client terminals located around as a conventional operation, and in the embodiments of the present invention, the server also provides the identifier of user A. As shown in FIG. 6, client terminal B indicates that there is a chat group initiated by user A while the identifier of the chat group is undisclosed. Further, as shown in FIG. 6, the chat groups established by users located around are displayed at the top, and an icon is added behind the identifier of the user, so as to facilitate users to find out the chat group.

In block 304, each of client terminals B~G requests users B~G to input authentication information when each of users B~G wants to join the chat group.

As one of the second client terminals in this embodiment, client terminal B is taken as an example.

Figure 7:
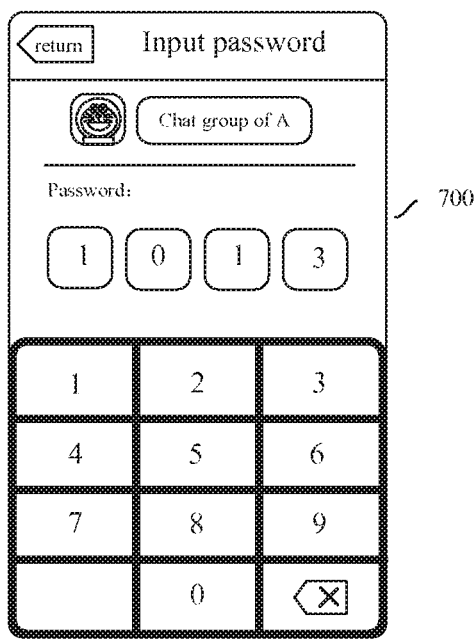
FIG. 7 is a schematic diagram illustrating an interface on a second client terminal when a user of the second client terminal is request to input authentication information according to an embodiment of the present invention.

When user B wants to join the chat group, user B may click the position of the chat group on an interface 600 of client terminal B as shown in FIG. 6, and then client terminal B requests to join the chat group via sending a request message. The server obtains authentication information from client terminal B. As shown in FIG. 7, client terminal B requests user B to input authentication information via an interface 700, the authentication information is the identifier of the chat group in this embodiment.

Because the users get together, it is quite easy for the users of the second client terminals to obtain the identifier of the chat group. For example, after initiating the chat group, user A may orally inform users B~G the identifier of the chat group, i.e. the password of the chat group is "1013".

In this embodiment, because the digits are easy to input via the mobile terminal, it is more convenient for the user if the chat group is identified via digits. In addition, if the chat group is merely established for multiple friends that are together, other users except the multiple friends will not interested in the chat group even the identifier of the chat group is provided.

In block 305, each of client terminals B~G receives the authentication information input by each of users B~G respectively, and sends the authentication information to the server.

In this block, users B~G input "1013" as the authentication information.

In block 306, the server performs authentication, determines whether the authentication information from each of client terminals B~G is identical with the identifier of the chat group. If the authentication information from each of client terminals B~G is identical with the identifier of the chat group, the server adds each of client terminals B~G into the chat group.

Figure 8:
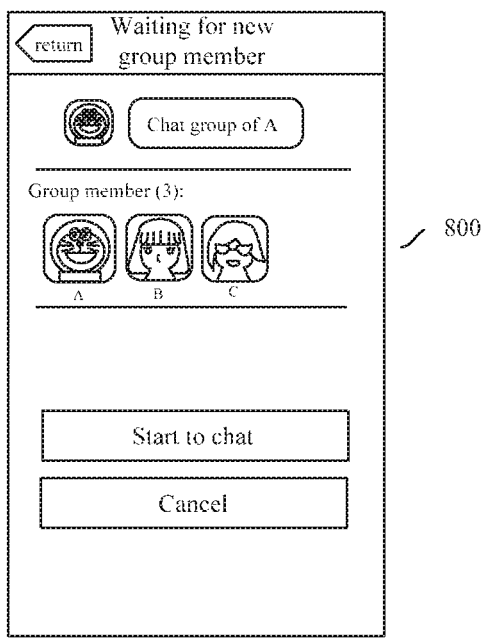
FIG. 8 is a schematic diagram illustrating an interface on a first client terminal after a second client terminal is added to a chat group according to an embodiment of the present invention.

In this embodiment, after adding each of client terminals B~G into the chat group, the server may also send information of each of client terminals B~G to client terminal A, so that client terminal A may display the information of each of client terminals B~G. As shown in FIG. 8, an interface 800 indicates that users B and C have joined the chat group. User A that initiating the chat group will know the current group members of the chat group, so as to control the establishing of the chat group. For example, if the group member currently added is not one of users B~G, the group member currently added may be removed from the chat group by user A.

Further, the server may also send information of user A and information of other group members to the second client terminal. For example, profiles and nick names of user A and users B~F may be sent to client terminal G, so that the user of the second client terminal is able to view the group members directly.

In block 307, the server finishes establishing of the chat group when client terminals B~G have added into the chat group.

In the embodiment, the information of each of client terminals B~G is sent to user A in block 306, so that client terminal A may send the finish request to the server after user A clicks a finish button, i.e. when all friends around user A have added into the chat group.

In this way, the operations performed by user A that initiates the group chat are simplified, user A does not need to add each of users B~G as the contact firstly and then select users B~G from all contacts respectively. Instead, user A sends the request for establishing the chat group and sends the finish request when all users B~G have added into the chat group. It is much convenient for user A to establish the chat group.

In addition, if the finish request is not received for a preset length of time, i.e. 60 s, the server directly finishes establishing the chat group, and returns prompt information to the first client terminal; if the number of the group members reaches a preset maximum, i.e. 20, the server directly finishes establishing the chat group, and returns prompt information to the first client terminal.

In embodiments of the present invention, after the chat group is established, in the chat group, one of the group members may add other group members as contact.

As can be seen, according to the embodiments of the present invention, the first client terminal does not need to add the friend as the contact firstly and then select the friend from all contacts. Instead, the first client terminal sends the request for establishing the chat group, more than one second client terminals in the predetermined geographic scope around the location of the first client may join the chat group, no matter whether the second client is one of contacts of the first client. The operations performed by the first client terminal that initiates the group chat are simplified, it is much convenient for the first client terminal to establish the chat group, and experiences of the user are improved.

Figure 9:
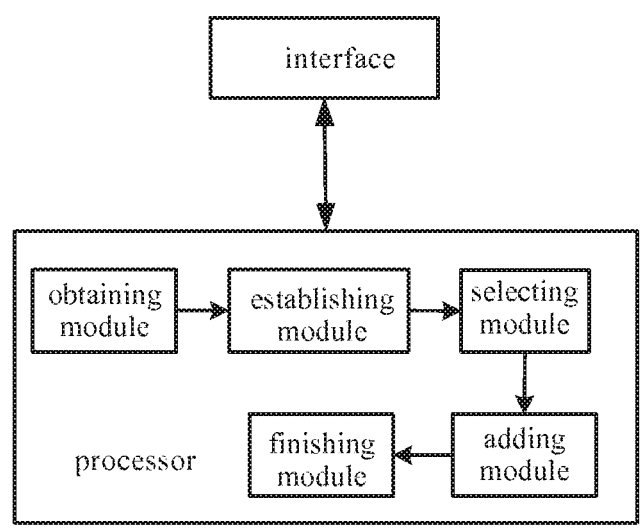
FIG. 9 is a schematic diagram illustrating an apparatus for establishing a chat group according to an embodiment of the present invention.

FIG. 9 is a schematic diagram illustrating an apparatus for establishing a chat group according to an embodiment of the present invention.

As shown in FIG. 9, the apparatus includes: an interface and a processor. The processor includes an obtaining module, an establishing module, a selecting module, an adding module and a finishing module.

The interface is to receive a request for establishing a chat group sent by a first client terminal. The request for establishing the chat group includes an identifier of a user of the first client terminal, an identifier of a chat group to be established.

The obtaining module is to obtain the identifier of the user of the first client terminal, the identifier of a chat group to be established and a geographic position of the first terminal, according to the request for establishing the chat group. When the geographic position of the first terminal is included in the request for establishing the chat group, the obtaining module is to directly obtain the geographic position of the first terminal from the request for establishing a chat group; when the geographic position of the first terminal is not included in the request for establishing the chat group, the obtaining module is to obtain the geographic position of the first terminal by locating the first client terminal.

The establishing module is to establish a chat group entry according to the identifier of the user of the first client terminal, the identifier of a chat group to be established and a geographic position of the first terminal, store the chat group entry, add the first client terminal to the chat group.

The selecting module is to selects at least one second client terminals within a predetermined geographic scope.

Specifically, the selecting module is to search for client terminals around the first client terminal; and select the client terminal as the second client terminal when the distance between the client terminal and the first client terminal is shorter than a preset value. Or the selecting module is to search for client terminals around the first client terminal; determine whether the client terminals around the first client terminal request to obtain information of other client terminal located around, and selecting the client terminal as the second client terminal when the distance between the client terminal and the first client terminal is shorter than the preset value and the client terminal requests to obtain information of other client terminal located around.

After the chat group entry is established by the establishing module of the processor, the interface is to send automatically an invitation message to join the chat group to the at least one second client terminal. Specifically, the invitation message to join the chat group comprises: the identifier of the first client terminal and an instruction of inputting the identifier of the chat group via the second client terminal; or the invitation message to join the chat group comprises: the identifier of the chat group and an instruction of inputting the identifier of the first client terminal via the second client terminal.

The interface is to receive authentication information input by the user of the second client terminal from the second client terminal.

The adding module is to perform authentication; if the authentication information is successful, add the user of the second client terminal into the chat group. Specifically, when the invitation message to join the chat group includes the identifier of the first client terminal, the adding module is to determine whether the authentication information is identical with the identifier of the chat group; when the invitation message to join the chat group includes the identifier of the chat group, the adding module is to determine whether the authentication information is identical with the identifier of the first client terminal.

After adding the second client terminal into the chat group, the interface of the processor is further to send information of the second client terminal to the first client terminal.

The finishing module is to finish establishing the chat group when a preset condition is met. The preset condition includes that a finish request sent from the first client terminal is received; or a procedure of establishing the chat group reaches a preset length of time; or the number of the group members reaches a preset maximum.

In addition, the interface of the processor is further to send information of the first client terminal and information of other group members to the second client terminal.

As can be seen, according to the embodiments of the present invention, the first client terminal does not need to add the friend as the contact firstly and then select the friend from all contacts. Instead, the first client terminal sends the request for establishing the chat group, more than one second client terminals in the predetermined geographic scope around the location of the first client may join the chat group, no matter whether the second client is one of contacts of the first client. The operations performed by the first client terminal that initiates the group chat are simplified, it is much convenient for the first client terminal to establish the chat group, and experiences of the user are improved.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for establishing a chat group, comprising:
at a server of a social networking platform, the server having one or more processors and memory:
receiving, from a first client terminal that corresponds to a first user on the social network platform, a request for establishing a chat group, the request including a geographic position of the first client terminal, an identifier of the first user and authentication information chosen by the first user, without receiving an identifier of an existing social network contact of the first user on the social networking platform;
in response to receiving the request to establish the chat group:
initiating a process to establish a first chat group including the first user, including:
creating a respective group chat entry for the first chat group, the group chat entry having group-specific information associated with the first chat group; and
monitoring incoming requests for additional users to join the first chat group;
while monitoring the incoming requests for additional users to join the first chat group, detecting a request from a second client terminal corresponding to a second user of the social network platform to obtain information of other client terminals located around the second client terminal;
in accordance with the request from the second client terminal and in accordance with a determination that the second client terminal is located within a preset distance of the geographic position of the first client terminal, sending a request to the second client terminal to enter authentication information corresponding to the first chat group, the request including the group-specific information of the first chat group;
receiving the authentication information from the second client terminal, wherein the authentication information is shared by the first user with the second user independently of the server of the social network platform; and
in accordance with a determination that the authentication information is correct, establishing the first chat group including the first user and the second user.

2. The method of claim 1, wherein the request for establishing the chat group includes a passcode, and wherein the server stores the respective group chat entry for the first chat group with a group identifier identical to the passcode.

3. The method of claim 2, wherein the server uses the passcode as the authentication information for joining the first chat group.

4. The method of claim 1, further including:
while monitoring the incoming requests for additional users to join the first chat group, detecting a request from the first client terminal to close the first chat group; and
in response to detecting the request from the first client terminal to close the first chat group, completing the process for establishing the first group chat, including:
ceasing to allow additional users to join the first chat group based on a current location of first client terminal; and
allowing additional users to join the first chat group by first becoming social network contacts of the first user on the social networking platform.

5. The method of claim 4, wherein the first chat group includes at least a first member that is added to the first chat group after the first member became a social network contact of the first user, and includes at least a second member that is added to the first chat group before the second member became a social network contact of the first user.

6. The method of claim 1, wherein determining that the authentication is correct includes determining that the authentication information received from the second client terminal is identical to an identifier of the first group chat entry stored at the server.

7. The method of claim 6, wherein the identifier of the first group chat entry is included in the request for establishing the group chat that is received from the first client terminal.

8. A server of a social network platform, comprising:
one or more processors; and
memory storing instructions, the instructions, when executed by the one or more processors, cause the processors to perform operations comprising:
receiving, from a first client terminal that corresponds to a first user on the social network platform, a request for establishing a chat group, the request including a geographic position of the first client terminal, an identifier of the first user and authentication information chosen by the first user, without receiving an identifier of an existing social network contact of the first user on the social networking platform;
in response to receiving the request to establish the chat group:
initiating a process to establish a first chat group including the first user, including:
creating a respective group chat entry for the first chat group, the group chat entry having group-specific information associated with the first chat group; and
monitoring incoming requests for additional users to join the first chat group;
while monitoring the incoming requests for additional users to join the first chat group, detecting a request from a second client terminal corresponding to a second user of the social network platform to obtain information of other client terminals located around the second client terminal;
in accordance with the request from the second client terminal and in accordance with a determination that the second client terminal is located within a preset distance of the geographic position of the first client terminal, sending a request to the second client terminal to enter authentication information corresponding to the first chat group, the request including the group-specific information of the first chat group;
receiving the authentication information from the second client terminal, wherein the authentication information is shared by the first use with the second user independently of the server of the social network platform; and in accordance with a determination that the authentication information is correct, establishing the first chat group including the first user and the second user.

9. The server of claim 8, wherein the request for establishing the chat group includes a passcode, and wherein the server stores the respective group chat entry for the first chat group with a group identifier identical to the passcode.

10. The server of claim 9, wherein the server uses the passcode as the authentication information for joining the first chat group.

11. The server of claim 8, wherein the operations further include:
while monitoring the incoming requests for additional users to join the first chat group, detecting a request from the first client terminal to close the first chat group; and
in response to detecting the request from the first client terminal to close the first chat group, completing the process for establishing the first group chat, including:
ceasing to allow additional users to join the first chat group based on a current location of first client terminal; and
allowing additional users to join the first chat group by first becoming social network contacts of the first user on the social networking platform.

12. The server of claim 11, wherein the first chat group includes at least a first member that is added to the first chat group after the first member became a social network contact of the first user, and includes at least a second member that is added to the first chat group before the second member became a social network contact of the first user.

13. The server of claim 8, wherein determining that the authentication is correct includes determining that the authentication information received from the second client terminal is identical to an identifier of the first group chat entry stored at the server.

14. The server of claim 13, wherein the identifier of the first group chat entry is included in the request for establishing the group chat that is received from the first client terminal.

15. A non-transitory computer-readable storage medium storing instructions, the instructions, when executed by one or more processors, cause the processors to perform operations comprising:
at a server of a social networking platform:
receiving, from a first client terminal that corresponds to a first user on the social network platform, a request for establishing a chat group, the request including a geographic position of the first client terminal, an identifier of the first user and authentication information chosen by the first user, without receiving an identifier of an existing social network contact of the first user on the social networking platform;
in response to receiving the request to establish the chat group:
initiating a process to establish a first chat group including the first user, including:
creating a respective group chat entry for the first chat group, the group chat entry having group-specific information associated with the first chat group; and
monitoring incoming requests for additional users to join the first chat group;
while monitoring the incoming requests for additional users to join the first chat group, detecting a request from a second client terminal corresponding to a second user of the social network platform to obtain information of other client terminals located around the second client terminal;
in accordance with the request from the second client terminal and in accordance with a determination that the second client terminal is located within a preset distance of the geographic position of the first client terminal, sending a request to the second client terminal to enter authentication information corresponding to the first chat group, the request including the group-specific information of the first chat group;
receiving the authentication information from the second client terminal, wherein the authentication information is shared by the first user with the second user independently of the server of the social network platform; and
in accordance with a determination that the authentication information is correct, establishing the first chat group including the first user and the second user.

16. The computer-readable storage medium of claim 15, wherein the request for establishing the chat group includes a passcode, and wherein the server stores the respective group chat entry for the first chat group with a group identifier identical to the passcode.

17. The computer-readable storage medium of claim 16, wherein the server uses the passcode as the authentication information for joining the first chat group.

18. The computer-readable storage medium of claim 15, wherein the operations further include:
while monitoring the incoming requests for additional users to join the first chat group, detecting a request from the first client terminal to close the first chat group; and
in response to detecting the request from the first client terminal to close the first chat group, completing the process for establishing the first group chat, including:
ceasing to allow additional users to join the first chat group based on a current location of first client terminal; and
allowing additional users to join the first chat group by first becoming social network contacts of the first user on the social networking platform.

19. The computer-readable storage medium of claim 18, wherein the first chat group includes at least a first member that is added to the first chat group after the first member became a social network contact of the first user, and includes at least a second member that is added to the first chat group before the second member became a social network contact of the first user.

20. The computer-readable storage medium of claim 15, wherein determining that the authentication is correct includes determining that the authentication information received from the second client terminal is identical to an identifier of the first group chat entry stored at the server.

* * * * *